(12) United States Patent
Macferren, III

(10) Patent No.: US 11,627,776 B2
(45) Date of Patent: Apr. 18, 2023

(54) COMMUNICATION-ENABLED HARD HAT

(71) Applicant: Ronald L. Macferren, III, Runnemede, NJ (US)

(72) Inventor: Ronald L. Macferren, III, Runnemede, NJ (US)

(*) Notice: Subject to any disclaimer, the term of this patent is extended or adjusted under 35 U.S.C. 154(b) by 0 days.

(21) Appl. No.: 17/499,971

(22) Filed: Oct. 13, 2021

(65) Prior Publication Data

US 2022/0110399 A1   Apr. 14, 2022

Related U.S. Application Data

(60) Provisional application No. 63/090,888, filed on Oct. 13, 2020.

(51) Int. Cl.
*A42B 3/30* (2006.01)
*H04B 1/3827* (2015.01)

(52) U.S. Cl.
CPC ............... *A42B 3/30* (2013.01); *H04B 1/385* (2013.01); *H04B 2001/3866* (2013.01)

(58) Field of Classification Search
CPC .... H04B 1/385; H04B 1/3833; H04B 1/3888; H04B 2001/3866; A42B 3/30
See application file for complete search history.

(56) References Cited

U.S. PATENT DOCUMENTS

| | | | |
|---|---|---|---|
| 11,013,289 B1 | 5/2021 | Lucero | |
| 11,096,439 B2 | 8/2021 | King et al. | |
| 2016/0157548 A1* | 6/2016 | Copeland | A42B 3/32 2/425 |
| 2021/0275083 A1* | 9/2021 | Johnson | A61B 5/7267 |
| 2021/0294884 A1* | 9/2021 | Lasser | H04L 9/3231 |
| 2022/0004308 A1* | 1/2022 | Simpson | G06Q 20/123 |

* cited by examiner

*Primary Examiner* — Thanh C Le
(74) *Attorney, Agent, or Firm* — Paul & Paul

(57) ABSTRACT

A communication-enabled hard hat includes a control panel mounted in one side of the hard hat for establishing a Bluetooth connection with an external device.

8 Claims, 2 Drawing Sheets

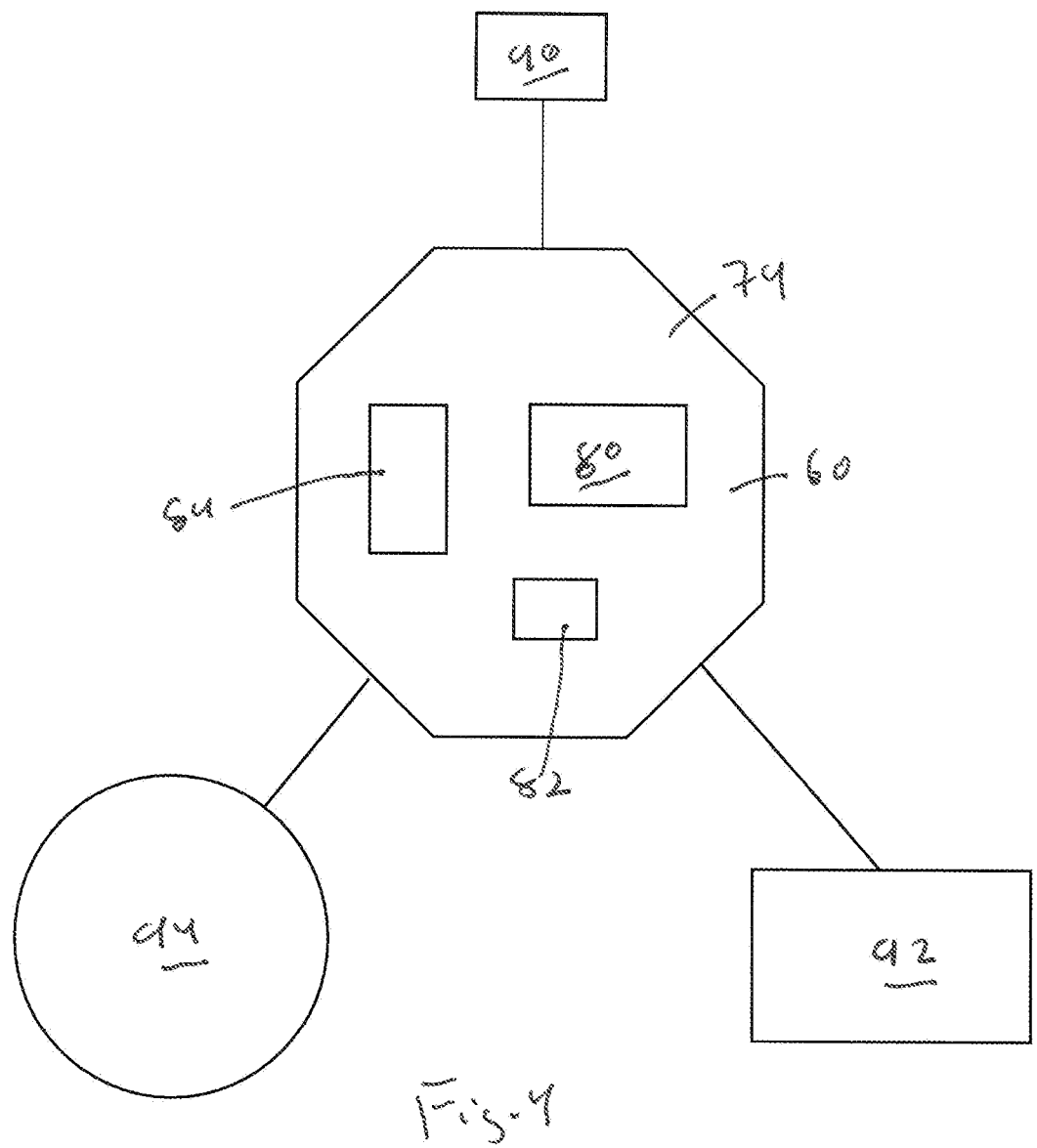

COMMUNICATION-ENABLED HARD HAT

CROSS-REFERENCE TO RELATED APPLICATION

This application claims the priority of U.S. Provisional Patent Application 63/090,888, filed Oct. 13, 2020, which is incorporated by reference in its entirety.

BACKGROUND OF THE INVENTION

1. Field of the Invention

The present invention relates to devices for communication under job-site conditions.

2. Brief Description of the Prior Art

Hard hats are compulsory protection for workers at construction job-sites and in many other situations. Frequently, construction jobs and the like require frequent communication among workers separated about the construction site, often under adverse environmental conditions. A variety of different solutions have been attempted to resolve the difficulty of communication under such conditions, such as push-to-talk communication devices, conventional cell phones, and the like. While such solutions have been successfully employed, they generally suffer from the necessity of providing a stand-alone communication device which must be operated using one's hands. However, there are situations in which a hands-free device would be very useful. One possible approach would be to incorporate a communication device in the hard hat conventionally worn under these conditions. One approach to solving the problem, disclosed in U.S. Pat. No. 11,013,289, is a hard hat with an integral communication system. In this device, speakers are provided adjacent the user's ears, and the device is controlled by buttons mounted under the rim of the hard hat, as is a microphone. However, the device requires major adaptations to conventional hard hats, given the placement of the controls, microphone and speakers. There is accordingly a continuing need for a communication-enabled hard hat which is simple to construct and easy to use.

SUMMARY OF THE INVENTION

The present invention provides a communication-enabled hard hat, the hard hat comprising an impact resistant shell. The shell preferably has a central dome-shaped portion having a lower section. The dome-shaped portion is adapted to conform to the human head. The shell also includes a brim extending from the lower section of the dome-shaped portion. The shell has a front area, a rear area, a left-side area, and a right-side area. The hard hat includes a communication module mounted within the impact resistant shell. The communication module includes a control panel, the control panel mounted in an aperture formed in the right area or the left-side area of the dome-shaped portion. The control panel includes switches for controlling power, and connection to a Bluetooth-enabled external device. The hard hat also includes a Bluetooth receiver/transmitter circuit, a battery, a battery charging circuit, an audio amplifier circuit, and at least one speaker. Preferably, the communication-enabled hard hat further includes a flexible membrane covering the aperture. Preferably, the switches are activated by pressure applied on the membrane. Preferably, the battery charging circuit is enabled to receive an external current through a USB connection. In one aspect, the communication-enabled hard hat is adapted to communicate with a Bluetooth-enabled cell phone. In another aspect, the communication-enabled hard hat is adapted to communicate with a Bluetooth-enabled device providing an Internet connection. In one presently preferred embodiment, the communication-enabled hard hat is adapted to communicate with a Bluetooth-enabled external device providing streamed media content. In one presently preferred embodiment, the Bluetooth receiver/transmitter circuit, the battery charging circuit, the audio amplifier circuit, and the switches are mounted on a common printed circuit board. In a presently preferred embodiment, the communication-enabled hard hat further includes an adapter for mounting the printed circuit board on the interior of the hard hat.

BRIEF DESCRIPTION OF THE DRAWINGS

FIG. 4 is a fragmentary interior view of the hard hat of FIG. 1 showing the communications module.

DETAILED DESCRIPTION

The features, advantages and operation of the present invention will become readily apparent and further understood from a reading of this detailed description with the accompanying drawings, in which like numerals refer to like elements.

Figure 1:
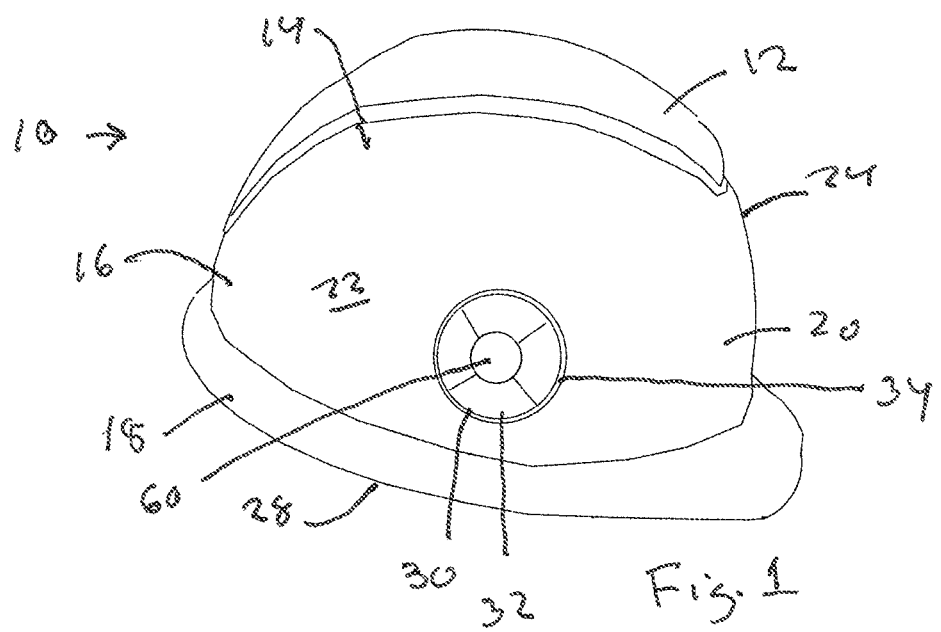
FIG. 1 is a perspective view of a communication-enabled hard hat according to the present invention.

A perspective view of a communication-enabled hard hat 10 according to the present invention is shown in FIG. 1. The hard hat 10 includes an impact resistant shell 12 preferably formed from a tough, impact resistant material such as high-density polyethylene. The shell 12 includes a central, dome-shaped portion 14 having a lower section 16. The shell 12 also includes a brim 18 extending from the lower portion 16 of the dome-shaped portion 14. The dome-shaped portion 14 includes a front area 20, a rear area 22, a left-side area 24 and a right-side area 26, as well as an interior surface 28 (FIG. 4). Positioned in the right-side area 26 is a generally circular aperture 30 in which is mounted a communications module 60. The portion of the communications module 60 extending through the exterior surface of the shell 12 is covered with a flexible membrane 32. The communications module 60 is controlled by the individual wearing the hard hat 10 by reaching up with his or her right hand and pressing on a portion of the flexible membrane 32. The flexible membrane 32 is divided into five target surfaces each of which includes an indicium of a control signal to be acted upon by the communications module 60. The indicia are preferably formed as raised portions of the membrane 32 such that they can be readily recognized by the user employing his or her fingers to touch the membrane 32. The indicia preferably correspond to the generally recognized signs for controlling media devices, such as the symbol play/pause toggle (□), and like symbols for connecting or disconnecting to a phone, turning the communications module 60 on and off, raising or lowering the speaker volume, etc. While the communications module 60 is depicted as being mounted in the right side of the shell 12, so that it can be readily accessed by right-handed individuals, the communications module 60 may alternatively be mounted in the left side of the shell 12 so that the module 60 can be easily accessed by left-handed individuals.

Figure 2:
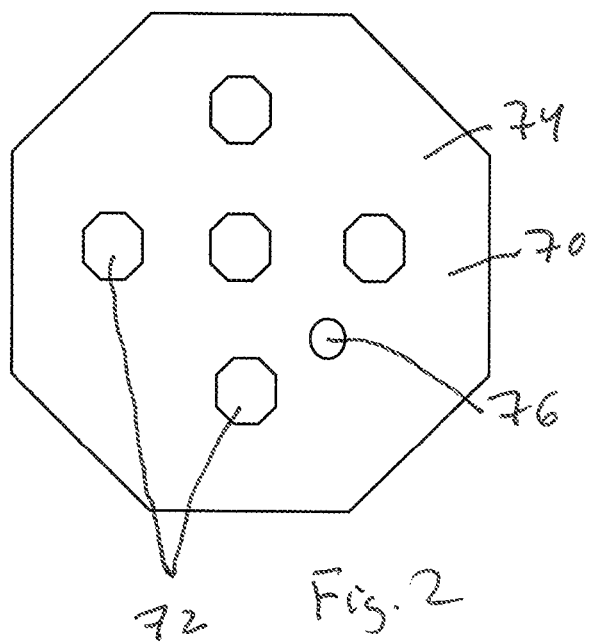
FIG. 2 is a fragmentary interior view of the hard hat of FIG. 1 showing partial assembly of the communications module.
Figure 3:
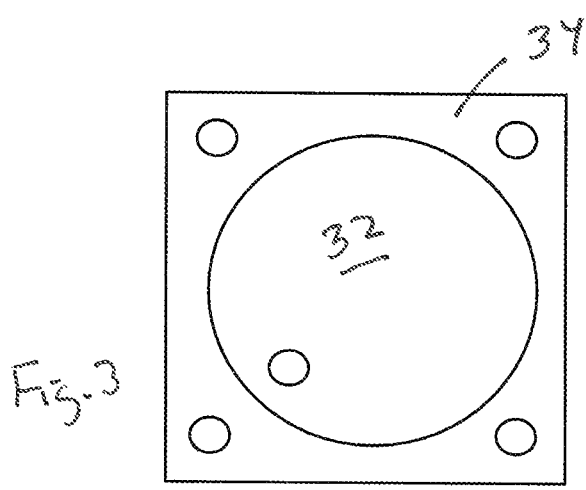
FIG. 3 is a plan view of the outside of the printed circuit board of the hard hat of FIG. 1.

The communications module 60 includes a control panel 70 (FIG. 2). On the upper surface of the control panel 70 are mounted a plurality of miniature button switches 72 and a microphone 76. The upper surface of the control panel 70 is covered by the flexible membrane 32 so that pressing on a specific portion of the membrane 32 activates a corresponding switch 72. The switches 72 control specific functions of the communications module 60, including power on/off, play/pause, call, volume up, volume down, fast forward and rewind. A small aperture is formed in the membrane 32 proximate the portion of the control panel 70 where the microphone 76 is located.

The control panel 70 comprises the front surface of a printed circuit board 74. The printed circuit board 74 is attached to a mounting adapter 34 by a plurality of screws, and the mounting adapter 34, which includes a circular aperture through which the membrane 32 protrudes, is cemented to the interior 28 of the shell 12 proximate the aperture 30.

Mounted on the rear side of the printed circuit board 74 are a Bluetooth receiver/transmitter circuit 80, a battery charging circuit 82 and an audio amplifier circuit 84 (FIG. 4). A female USB connector 90 is mounted under the printed circuit board 74 proximate the bottom of the shell 12, so that the communications module 60 can be connected to a USB device for charging its battery 92. The battery 92 and an audio speaker 94 are mounted on the interior 28 of the shell 12, such as by a suitable adhesive material. The USB connector 90, the battery 92, and the speaker 94 are each connected by cables to the printed circuit board 74.

Many changes can be made in the above-described invention without departing from the intent and scope thereof. It is, therefore, intended that the above description be read in the illustrative sense and not in the limiting sense. Substitutions and changes can be made while still being within the scope and intent of the invention and of the appended claims.

The invention claimed is:

1. A communication-enabled hard hat, the hard hat comprising:

an impact resistant shell, the shell having a central dome-shaped portion having a lower section, the dome-shaped portion being adapted to conform to the human head, and a brim extending from the lower section of the dome-shaped portion, the shell having a front area, a rear area, a left-side area, and a right-side area, and a communications module mounted within the impact resistant shell, the communications module including:
a control panel, the control panel being mounted in an aperture formed in the right-side area or the left-side area of the dome-shaped portion, the control panel including switches for controlling power, and connection to a Bluetooth-enabled external device,
a Bluetooth receiver/transmitter circuit,
a battery,
a battery charging circuit,
an audio amplifier circuit, and
at least one speaker.

2. The communication-enabled hard hat of claim 1, further including a flexible membrane covering the aperture, the switches being activated by pressure applied on the membrane.

3. The communication-enabled hard hat of claim 1, wherein the battery charging circuit is enabled to receive an external current through a USB connection.

4. The communication-enabled hard hat of claim 1, wherein the Bluetooth-enabled external device is a cell phone.

5. The communication-enabled hard hat of claim 1, wherein the Bluetooth-enabled external device provides an Internet connection.

6. The communication-enabled hard hat of claim 1, wherein the Bluetooth-enabled external device provides streamed media content.

7. The communication-enabled hard hat of claim 1, wherein the Bluetooth receiver/transmitter circuit, the battery charging circuit, the audio amplifier circuit, and the switches are mounted on a common printed circuit board.

8. The communication-enabled hard hat of claim 7, further including an adapter for mounting the printed circuit board on the interior of the hard hat.

* * * * *